Nov. 5, 1957   H. GRUENER   2,812,131
COMBINED PAPER FEED AND FUNCTION CONTROL MECHANISM
Filed June 15, 1953   3 Sheets-Sheet 1
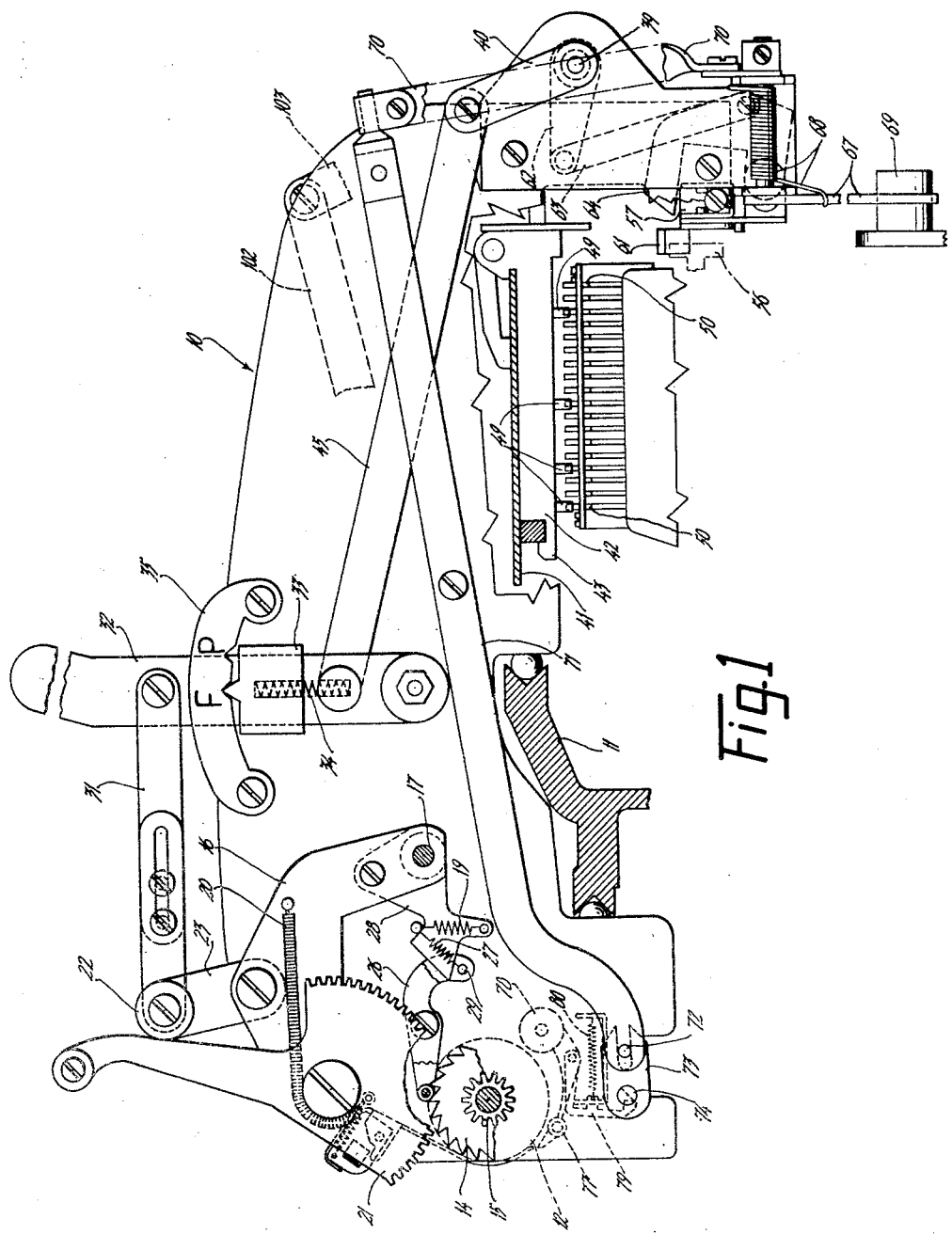
INVENTOR.
HERMANN GRUENER
BY
Jesse A. Holton
ATTORNEY Nov. 5, 1957 H. GRUENER 2,812,131
COMBINED PAPER FEED AND FUNCTION CONTROL MECHANISM
Filed June 15, 1953 3 Sheets-Sheet 2
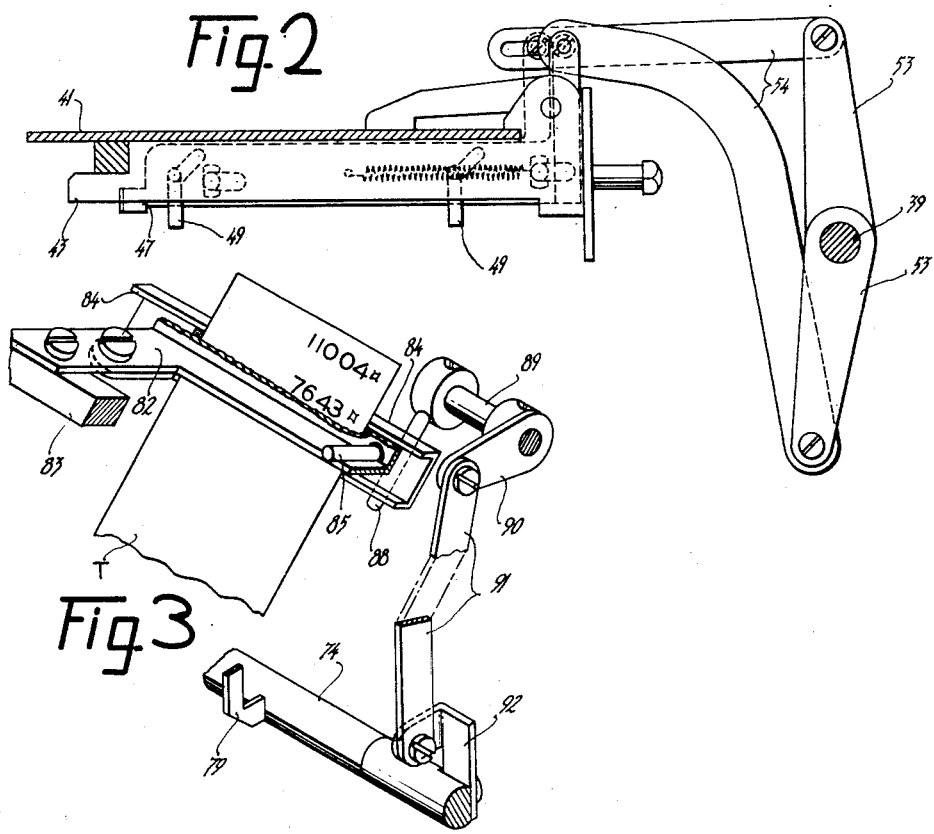
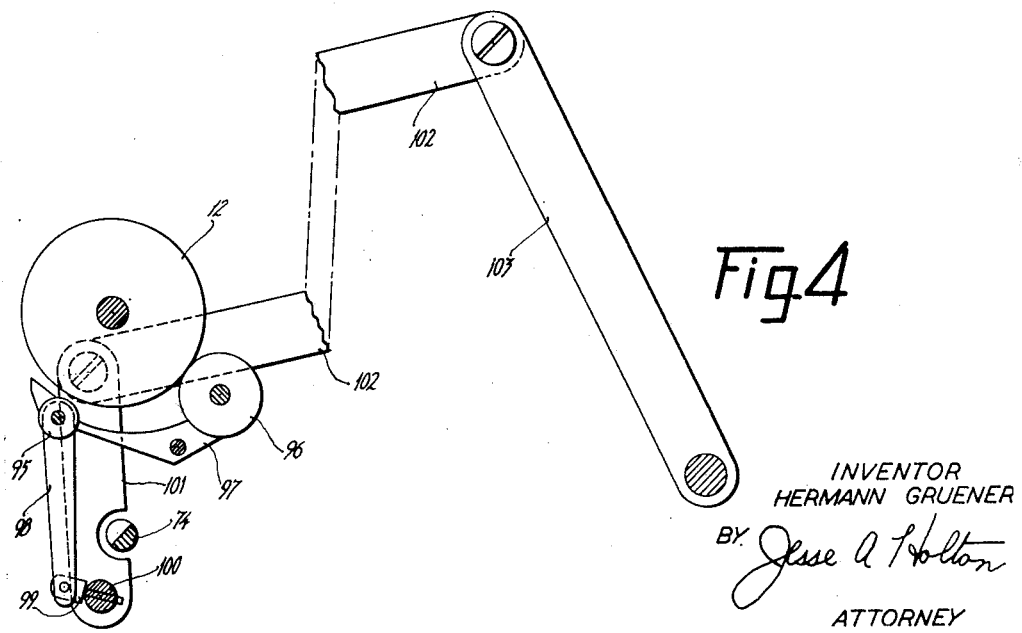
INVENTOR
HERMANN GRUENER
BY Jesse A. Holton
ATTORNEY Nov. 5, 1957          H. GRUENER          2,812,131
COMBINED PAPER FEED AND FUNCTION CONTROL MECHANISM
Filed June 15, 1953          3 Sheets-Sheet 3
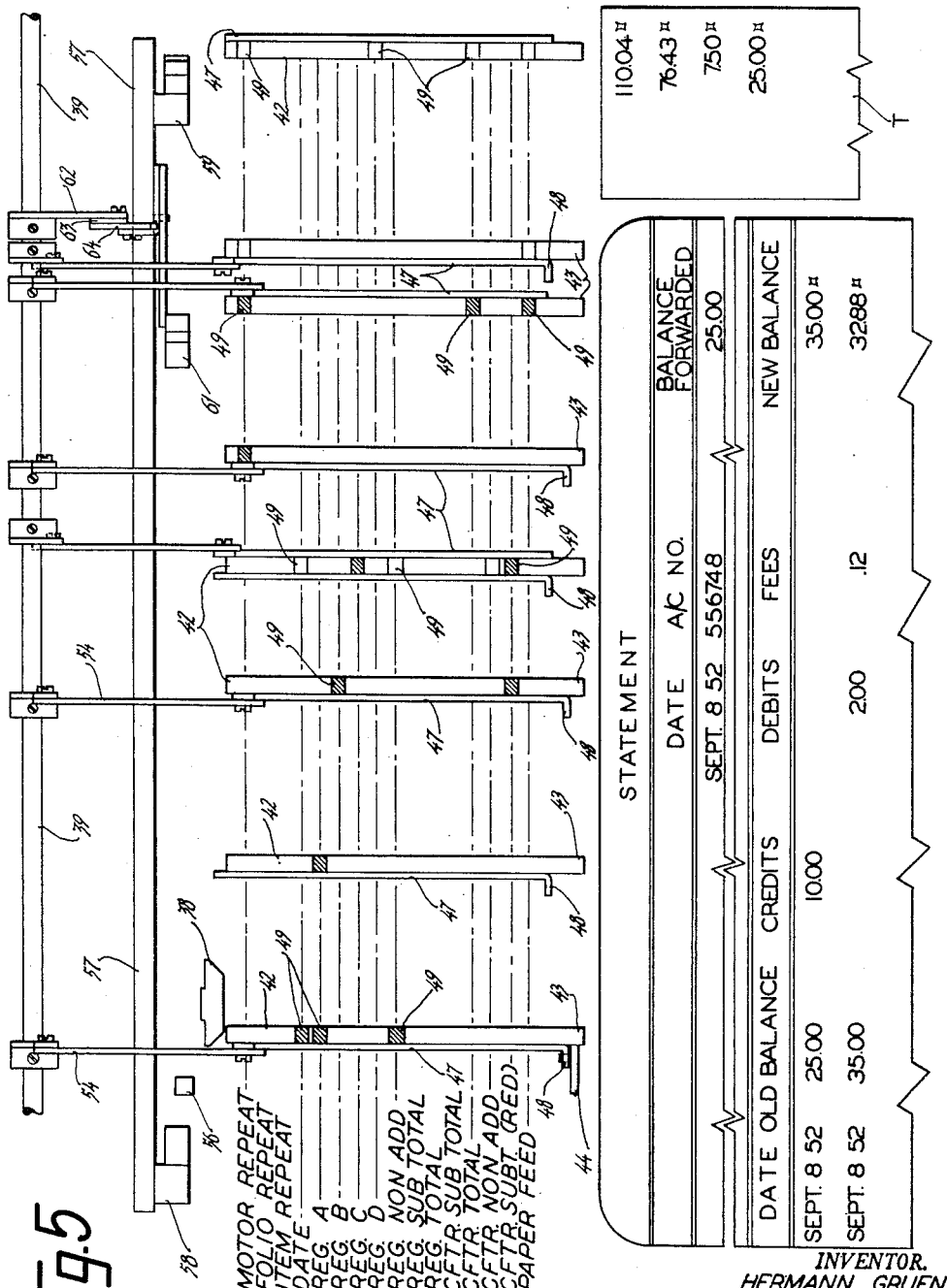
INVENTOR.
HERMANN GRUENER
BY
Jesse A. Holton
ATTORNEY United States Patent Office 2,812,131
Patented Nov. 5, 1957

2,812,131

COMBINED PAPER FEED AND FUNCTION CONTROL MECHANISM

Hermann Gruener, Zurich, Switzerland, assignor to Underwood Corporation, New York, N. Y., a corporation of Delaware Application June 15, 1953, Serial No. 361,713

9 Claims. (Cl. 235—60.51)

This invention relates to a combined function control and work sheet injecting mechanism for an accounting machine, more particularly to a work sheet injector adjustable to preselect the inserted position of a work sheet and to simultaneously adjust the machine function controls to preselect appropriate machine functions.

In some installations of accounting machines, it is desirable to perform two distinct operations on separate lines of a work sheet at different times, i. e., a preliminary operation will be to forward balances to one line of a group of sheets and at a later time entries are to be made on the same sheets. In such operations, injection of the forms to the proper line will save considerable time and if the accounting machine function controls are always set to the functions corresponding with the operation which is to be performed on the injected form, possibility of error will be eliminated.

It is, therefore, an object of the present invention to provide a work sheet inserting device which may be adjusted to insert a sheet to bring either of two lines thereon to a printing position and by the same adjustment to alter the machine function controls to determine machine functions corresponding to the entries to be made on the sheets.

Another object is to provide in such a machine a tally roll which may be brought into printing position when the sheets are inserted to one line and which is held against line spacing when the inserting mechanism is set to insert work sheets to a different line.

Other objects of the present invention will be apparent from the following description of a preferred embodiment of the invention.

In the accompanying drawings:

Figure 1 is a side view of an accounting machine carriage with the invention applied thereto, Figure 2 shows the manner in which the accounting machine controls are altered, Figure 3 is a perspective view showing the clamping mechanism for the tally roll, Figure 4 is a side view showing the mechanism for releasing the left feed rolls, and Figure 5 is a diagrammatic showing of the machine function controls and their relation to the work sheet used.

General description

The basic machine to which the present invention is applied is fully disclosed in U. S. Patent No. 2,194,270, issued March 19, 1940 to Oscar J. Sundstrand. The paper carriage of the Sundstrand patent is modified as shown in U. S. Patent No. 2,536,524, issued January 2, 1951 to Walter A. Anderson. A work sheet inserting device similar to that disclosed in U. S. Patent No. 1,847,316, issued March 1, 1932 to Oscar J. Sundstrand is used to feed new work sheets into printing positions and to eject completed sheets. An adjustable stop to control the depth of insertion of a work sheet is connected to a function control plate on the carriage so as to alter the controls to accord with the depth to which a work sheet is being inserted.

A tally strip positioned along side of the work sheet is provided with a separate act of feed rolls and with a paper clamp both controlled by the carriage to determine feeding of the tally strip only when amounts have been printed thereon.

Detailed description

More particularly described and referring to the appended drawings, the invention is applied to a carriage designated generally at 10, Figure 1, mounted for lateral movement on a rail 11 fixed to the frame (not shown). Rotatable in the carriage 10 is a platen 12 having a ratchet wheel 14 and a gear 15 on its right end. A platen rotating mechanism for sweep feed of the platen is secured to the right end of the carriage and comprises an arm 16 pivoted on a stud 17 in the right carriage end and tensioned clockwise, Figure 1, by a spring 19. Pivoted on arm 16 and tensioned clockwise by a spring 20 connected between it and arm 16 is a sector gear 21 having an upstanding handle and engageable with gear 15 of the platen. A stop 22 on an arm 23 pivoted on arm 16 is provided to limit restoration of sector gear 21. A conventional platen detent 26 is urged counterclockwise by a spring 27 to engage in the teeth of ratchet gear 14 on the platen 12 and retain platen 12 in any set position. An extension 28, secured to arm 16 is normally positioned above a pin 29 in the rear arm of detent 26 and will, when arm 16 is rocked counterclockwise, release detent 26 from ratchet wheel 14 to permit free rotation of platen 12.

This mechanism is in general the same as that described in the above Sundstrand Patent No. 1,847,316 and is operated by first depressing sector 21 and arm 16 to release detent 26 from ratchet wheel 14 and to engage sector 21 with gear 15 and then rotating sector 21 counterclockwise by its handle to rotate the platen. The initial position of sector 21 as determined by stop 22 will control the extent of rotation of the platen 12.

Stop 22 is set into either of two positions by a link 31 connected between the stop 22 and an arm 32 also pivoted on the right end of carriage 10. A detent slide 33 on arm 32 is tensioned upwardly by a spring 34 into engagement with notches in a fixed plate 35 to yieldably retain arm 32 in the adjusted positions.

The work sheet which is used in the present mechanism is illustrated in Figure 5 and it will be seen that there are two initial positions to which the sheet may be inserted. In actual practice, the top or balance forwarded line will be first filled in for a complete run of forms and the debit and credit entries will be entered at a later time. The forward position of arm 32 will position stop 22 so that injection of a work sheet will be stopped when the balance forwarded line is positioned at the printing point. When arm 32 is set to its rearward position, stop 22 is set to allow a greater effective movement of sector 21 and an injected sheet will be inserted further to position the first posting line at the printing point.

It may be seen from the column headings on the work sheet of Figure 5 that the accounting machine should perform different functions when balances are being forwarded than when postings are being made and the present invention includes mechanism to adjust the carriage carried function controls to correspond with the position to which a work sheet is inserted. When balances are being forwarded, the carriage is first arrested in the account number column near the center of the sheet. In this column the date and account number are printed in a non-addition operation and the carriage automatically tabulated to the balance column. The old balance is entered in the indexing mechanism and printed in this column. The machine then automatically goes through a blank cycle and then a total cycle to repeat print this balance on a tally strip as a total and thereafter return the carriage to the original account number column.

When entries are to be posted to the account, the arm 32 is moved to its rear position so that the work sheet will be inserted to the first posting line. For such entries, the carriage is initially positioned in the old balance column wherein the date and old balance will be entered. The carriage then moves to the credits column where the credit entry is set up and printed and the carriage then skip tabulates to a blank cycle column and then to a new balance column where the new balance is printed. An automatic carriage return follows the new balance printing to return the carriage before the tally stop is brought into printing position.

If the amount to be posted is a debit rather than a credit, as shown on the second posting line, the same functions are performed as above with the exception that the credit column is skipped and amounts are entered in the debit and fees columns. The change from a credit to a debit entry forms no part of the present invention and is manually controlled by positioning a cam 38, Figure 5, to disable one or the other set of tabulator stops corresponding to the columns to be skipped. Cam 38 is similar to cam 852 of the above Sundstrand Patent No. 2,194,270.

To adjust the machine function controls at the same time as the depth for insertion of a work sheet is selected, a shaft 39 is rotatably positioned at the rear of the carriage. Shaft 39 carries an arm 40 secured to its right end which arm 40 is connected by a link 45 to arm 32 to enable rocking of shaft 39 clockwise for a posting operation and counterclockwise for a forwarding operation.

Referring to the enlarged showing in Figure 2, a plate 41 is fixed in the carriage to support a plurality of control magazines 42, each magazine 42 determining one columnar position by the engagement of its forward end 43 with a vertically movable tabulator stop 44, see Figure 5. Each magazine may include a slide 47 on either its right or left side or both, the slides on the left side usually being formed with a bent off cam ear 48 which in one position of slide 47 will engage with a pin on tabulator stop 44 to depress the stop out of effective position and thus prevent arrest of the carriage at that columnar position.

Each magazine 42 also carries a number of function control lugs 49 which will when the carriage is in a columnar position, depress associated ones of the machine tappets 50 to determine the functions to be performed by the machine. Each control lug 49 may have on either side a lug which is engaged with an inclined slot in a slide 47 so that movement of a slide 47 to a forward position will act to withdraw the connected lugs 49 to an ineffective position. Further details of such magazines and their functions are more fully set out in the above Sundstrand Patent No. 2,194,270.

In the showing of Figure 5, the lugs 49 which are in effective position when the shaft 39 is set for posting are shown as sectioned while the lugs 49 which are used in forwarding balances are unsectioned. The retraction of the lugs which are not to be used in an operation and the projection of the ones to be effective is controlled by shaft 39 which as shown in Figure 2 is connected by arms 53 extending upwardly and downwardly from shaft 39 and by links 54 to the slides 47. A pin-and-slot connection between the links 54 and the slide pertaining to the debits column enables the slide 47 to be moved forwardly by either the shaft 39 or the credit-debit cam 38 to cause skipping of the columnar position.

The position from which the carriage 10 is to be returned to the initial position is also determined by the position of shaft 39. As indicated in Figures 1 and 5 and fully set forth in the above Anderson patent, a carriage return dog 56 is acted upon by stops settable on a bar 57, a left stop 58 serving to arrest operation of a carriage return drive and a right stop 59 initiating operation of the drive. During posting operations, it is desirable to initiate carriage return at the completion of the entry in the new balance column and prior to entry of the carriage into the tally roll position. To initiate such early carriage return, a special carriage return stop 61 is rendered effective by shaft 39 during such posting operations. Such special stop 61 is hinged to bar 57 and is normally free to move to an ineffective position when contacted by dog 56. During posting operations an arm 62, Figure 1, on shaft 39 connected by a link 63 to a lever 64 also pivoted on bar 57 rocks lever 64 counterclockwise to position the front end thereof over stop 61 and prevent moving of the stop 61 to ineffective position. In such conditions, contact of stop 61 with dog 56 will depress dog 56 to initiate an early carriage return.

During balance forwarding operations, the carriage will bring the tally stop at the right side of the work sheet to the printing position for a repeat printing of the balance. To conserve space on this tally strip it is desirable that the strip be line-spaced with the platen only when entries have been made on the strip. The strip is therefore normally free of the platen and is held against motion by a clamp, the clamp being released and the tally strip being fed with the platen only when the carriage is in position to print on the tally. To control these parts for the tally strip, a lever 67, Figure 1, is pivoted on the right rear of the carriage 10 and is held in a normal position by a spring 68. A forward arm of this lever projects downwardly and will contact a stud 69 as the carriage moves into its leftmost position to rock lever 67. A link 70 is connected between lever 67 and a second lever 71 pivoted on the carriage 10, lever 71 being connected by a stud 72 therein to a slotted arm 73 fixed to the usual front feed roll release shaft 74. The feed rolls 77 and 78 for the talley strip are pivoted on a lever 79. A spring 80 connected between the lever 79 and a stationary carriage part yieldingly holds the lower end of lever 79 against shaft 74 to hold the feed rolls 77 and 78 away from the platen 12. When lever 67 contacts stud 69, the lever is rocked to rotate arm 73 and shaft 74 counterclockwise through lever 71 and to bring a flat portion of shaft 74 under the lower end of lever 79. The rotation of lever 79 by its spring 80 thereupon moves feed rolls 77 and 78 against platen 12 to line-space tally strip T during subsequent rotations of the platen so long as the carriage 10 stays in the left-hand position.

When the feed rolls 77 and 78 are released from the strip T, the strip is clamped to prevent accidental movement by a clamp shown in Figure 3. The clamp comprises a fixed bar 82 mounted on one of the rods 83 running between the carriage ends. A second channelled bar 84 is pivoted on bar 82 at one end and carries a stud 85 which passes through a hole in bar 82 to support the other end. The tally strip T passes between the bars 82 and 84 and is held by forward movement of bar 84 against bar 82. An arm 88 on a shaft 89 pivoted in the carriage 10 is connected by another arm 90 on shaft 89 and a link 91 to an arm 92 on shaft 74 to press bar 84 into clamping position when shaft 74 is in the normal position and to release the clamp when shaft 74 is rotated to engage feed rolls 77 with platen 12.

It has been found that when a work sheet is inserted to forward balances, a previously entered sheet is not fed a distance sufficient to pass the lower edge of the sheet past the lower feed rolls, resulting in tearing of the sheets or dislocation of the newly inserted sheets during removal of the preceding ones. To obviate this difficulty, the feed rolls for the work sheet are released during forwarding operations by a mechanism as shown in Figure 4. The feed rolls for the work sheet include front feed rolls 95 and rear rolls 96 mounted on a floating lever 97. A link 98 is connected between the front feed rolls 95 and an arm 99 of a shaft 100 to lower the front feed rolls from platen 12 during forwarding operations. A second arm 101 on shaft 100 is connected by a link 102 to an arm 103 on shaft 39 to rock the shaft counterclockwise when the handle 32, Figure 1, is set for forwarding operations and thereby release feed rolls 95. It is to be understood that there is one link 98 and one arm 99 for each feed roll 95, for in the machine according to the Anderson patent above the feed rolls 95 are independent of each other.

The operation of the mechanism as above described may be summarized briefly as follows. During posting operations the carriage will be initially positioned in the old balance column and handle 32 will be in its rear position. A new work sheet is inserted into printing position by a full stroke of the handle of section 21. The date and old balance are now set up on the keys and the machine cycled to print and enter this amount. The carriage then tabulates to the debit or credit column depending upon the position of manually controlled cam 38 and the credit or debit amount is set on the keys. The machine is then cycled to print and enter the amount and to tabulate the carriage to a spacing stroke column. If debits are being entered, the carriage will be first arrested in a fees column where a similar operation is initiated. In the spacing stroke column, the machine is automatically cycled and tabulated to the new balance column where another automatic cycle takes place to print the new balance as a total and to release the carriage for further tabulation. As the carriage leaves the new balance column, cam 61, now held down by lever 64, strikes dog 56 to initiate a carriage return operation and return the carriage to its initial position wherein stop 58 strikes dog 56 to terminate the carriage return and allow the carriage 10 to settle in the old balance column for another debit or credit entry. During all entries on the work sheet, clamp 82, 84 holds the tally strip stationary and the feed rolls 77, 78 for the tally strip are retained in ineffective position.

When handle 32 is shifted to a forward position for forwarding balances, left slides 47 for the old balance column, debits column, and spacing stroke column are moved forwardly to prevent arrest of the carriage 10 in those columns. Also the right slide 47 on the magazine for the new balance column is moved forwardly to withdraw the lugs 49 which control the taking of a total in this column. In addition to these changes, the right slide 47 on the fees column magazine and the left slide 47 on a spacing stroke magazine to the right of the new balance magazine are moved rearwardly, the first slide enabling date printing and counteracting the effect of the lugs 49 which remain projected and the spacing stroke magazine being rendered effective to arrest the carriage 10 for an automatic spacing stroke to enable printing of a total on the tally strip. The carriage return stop 61 is freed to move to ineffective position when contacted by dog 56 and the front feed rolls for the work sheet are released. The control cam 38 must be moved to the debits position and the carriage is brought to the fees column by manual tabulation.

In the fees column, the date and an account number are indexed on the keys and the machine cycled to print the entries. The carriage is then released to tabulate through the spacing stroke column to the balance forwarded column wherein the balance is set up and entered. The carriage 10 after release is arrested at the now effective spacing stroke magazine 42 for a cycle and then moves to the tally strip column for an automatic total cycle. As the carriage moves into this last position, lever 67 contacts stud 69 to rock shaft 74 through lever 71 to release clamp 82, 84 and engage feed rolls 77 and 78 so that tally strip T will be line-spaced after the printing is effected. A slight additional movement of the carriage when released from tabulator stop 44 during the cycle will bring stop 59 against dog 56 to initiate an automatic carriage return. The carriage is returned until stop 58 strikes dog 56 to terminate the carriage return and the carriage is free to again move leftward to the first effective magazine 42. Magazines 42 for the old balance credits and debits columns are ineffective to arrest the carriage 10 for their left slides 47 have been moved forwardly, the first and third by shaft 39 and that for the credits column by cam 38 now in the debits position. The carriage is then first arrested in the fees column in readiness for injection of a new work sheet by operation of the handle of sector 21.

The above description of a preferred embodiment of my invention is not to be taken in a restrictive sense as many variations in structure are possible without departure from the spirit of the invention as set out in the appended claims.

What is claimed is:

1. In an accounting machine of the class described having a frame, a shiftable carriage on said frame, a platen carried in said carriage, mechanism for sweep feeding said platen to inject a work sheet into imprint receiving positions, a plurality of function control tappets pivoted on said frame, and a control plate on said carriage, said control plate having adjustable members thereon to define columnar positions of said carriage with respect to said frame and to operate selected ones of said tappets in said columnar positions, the combination of an adjustable stop member for said sweep feeding mechanism said stop member being positioned to limit injection of a work sheet by said sweep feeding mechanism into selected positions, a shaft in said carriage, individual members connecting said shaft and said adjustable members, said shaft and connecting members being positionable to adjust said adjustable members of said control plate into different tappet controlling positions and a positioning member connected to said stop member and to said shaft to both select a printing position to which said work sheet is to be inserted and to adjust said control plate members to cause functions appropriate to the printing position on said work sheet to be performed.

2. The invention as set forth in claim 1 including feed rolls cooperating with said platen to hold a work sheet against said platen, and means operated by said shaft to release said feed rolls from said platen in one position of said shaft.

3. In an accounting machine of the class described having a frame, function controls thereon, a carriage shiftable on said frame into columnar positions, adjustable members on said carriage, said members being shiftable with said carriage and individually engageable with said function controls to operate a selected combination of said function controls at each columnar position of said carriage, a platen in said carriage and manually operable means on said carriage for rotating said platen to inject a work sheet into printing positions, the combination of an arresting member, said member being adjustable to limit movement of said manually operable means and thereby controlling the extent to which a work sheet is injected, a settable member and connections from said settable member to certain of said adjustable members to alter the combination of function controls operated by each said adjustable means connected thereto to enable operation of said function controls in conformity with the extent to which a work sheet is injected, and means connected to said arresting member and said settable member to simultaneously control the extent of injection of a work sheet and the setting of said adjustable members to operate said function controls in a program corresponding to the injected position of a work sheet.

4. The invention as recited in claim 3 including feed rolls cooperating with said platen to hold a work sheet thereagainst and a linkage operated by said settable member to withdraw said feed rolls from said platen when said connected means is set to control injection of a work sheet to the least extent.

5. The invention as set out in claim 3 including a carriage return drive controlling means, spaced members cooperative therewith to shift said controlling means in drive initiating and drive terminating directions, a drive initiating member intermediate said spaced members and means operative by said settable member in one position thereof to render said drive initiating member effective on said drive controlling means.

6. The invention as set out in claim 5 including a set of feed rolls engageable with said platen to feed a tally strip, a clamp to hold a tally strip against movement with said platen, yieldable means to hold said feed rolls from said platen and said clamp in clamping position, and an abutment on said frame engageable by said yieldable means when said carriage is positioned to enable printing on said tally strip to engage said feed rolls with said platen and to release said clamp.

7. In an accounting machine of the class described having a frame, machine function control members on said frame, a shiftable carriage on said frame, a platen rotatable in said carriage, manually operable means to sweep feed said platen to inject a work sheet into printing positions and a plurality of adjustable function control member operating devices on said carriage to define columnar positions of said carriage and the functions to be performed in said columnar positions, the combination of a stop member settable to limit effective movement of said manually operable means and hence the depth to which a work sheet will be injected, a rotatable shaft, mechanism connecting said stop member and said shaft to set both said parts into corresponding positions, and members connecting said shaft with said function control member operating devices to determine for each position of said shaft the columnar positions of said carriage and the function control members to be operated in such columns.

8. The invention as set out in claim 7 including spaced members to initiate and to terminate a carriage return drive, a normally ineffective member interposed between said spaced members to initiate a carriage return drive and a linkage connected to said shaft to render said normally ineffective member effective in one position of said shaft.

9. The invention as set out in claim 8 including a set of feed rolls engageable with said platen to feed a tally strip therewith, a clamp to hold a tally strip against movement with said platen, a member common to said feed rolls and said clamp to engage said feed rolls and to release said clamp, yieldable means to hold said common member in feed roll releasing and clamp engaging position, a stationary member on said frame and a member forming a part of said yieldable means to engage said stationary member when said carriage has tabulated beyond the point of effectiveness of said normally ineffective member and operate said common member to release said clamp and to engage said feed rolls with said platen whereby a tally strip may be line-spaced only when said tally strip is in position to be printed upon.

References Cited in the file of this patent

UNITED STATES PATENTS

| | | |
|---|---|---|
| 1,208,376 | Rinsche | Dec. 12, 1916 |
| 1,282,820 | Hanson | Oct. 29, 1918 |
| 1,847,316 | Sundstrand | Mar. 1, 1932 |
| 2,022,823 | Racz | Dec. 3, 1935 |
| 2,274,575 | Anderson | Feb. 24, 1942 |
| 2,612,315 | Anderson | Sept. 30, 1952 |